United States Patent [19]

Sakamoto et al.

[11] Patent Number: 5,600,392
[45] Date of Patent: Feb. 4, 1997

[54] POSITION SENSOR

[75] Inventors: Tetsuo Sakamoto; Junichi Matsumoto; Tomio Kurosu, all of Tokyo, Japan

[73] Assignee: Copal Company Limited, Japan

[21] Appl. No.: 256,167

[22] PCT Filed: Nov. 24, 1993

[86] PCT No.: PCT/JP93/01716

§ 371 Date: Oct. 6, 1994

§ 102(e) Date: Oct. 6, 1994

[30] Foreign Application Priority Data

Nov. 25, 1992 [JP] Japan .................................. 4-338020

[51] Int. Cl.$^6$ .............................. G03B 9/08; G03B 9/02; G03B 7/08
[52] U.S. Cl. ............................................ 396/249; 396/452
[58] Field of Search ............................ 354/173.11, 217, 354/234.1, 451, 452, 456, 271.1

[56] References Cited

U.S. PATENT DOCUMENTS

| | | | |
|---|---|---|---|
| 4,462,672 | 7/1984 | Kurosu et al. | 354/435 |
| 4,996,549 | 2/1991 | Yamaguchi | 354/173.11 |
| 5,325,142 | 6/1994 | Depatie et al. | 354/234.1 |

FOREIGN PATENT DOCUMENTS 63-54129  4/1988  Japan.

*Primary Examiner*—Safet Metjahic
*Assistant Examiner*—Eddie C. Lee
*Attorney, Agent, or Firm*—Graham & James LLP

[57] ABSTRACT

A position sensor for detecting a position by comparing a detected level with a threshold level. This operation is performed without being affected by the characteristics intrinsic to the used sensor means or by power supply variations. Furthermore, the operation is not varied even if the sensor means ages. The sensor means is caused to shift from a first operating state to an unoperated state and then to a second operating state according to operation of an object whose position should be detected. The level of the output from the sensor means is compared with a threshold level. Thus, the timing at which the sensor means shifts from the unoperated state to the second operating state is detected. The output level detected when the sensor means is in the first state is stored in a capacitor and divided by resistors to obtain the threshold level. Therefore, if the characteristics of the used sensor means deviate from ideal characteristics, or if power source variations occur, then the threshold level is automatically corrected. Consequently, the operation of the sensor means is not affected by these deviation and power source variations.

10 Claims, 4 Drawing Sheets

PRIOR ART

POSITION SENSOR

TECHNICAL FIELD

The present invention relates to a position sensor and, more particularly, to a position sensor best suited for detection of a position in an apparatus (e.g., a device for detecting the position of a shutter blade in a still camera) which is equipped with a power supply producing an unstable output voltage level such as a dry battery or dry cell and in an apparatus which is not expected to be periodically inspected by the user.

BACKGROUND ART

A known position sensor compares the output of a sensor means with a given threshold level to detect the position of an object whose position should be detected, to control the position of the object, and to perform a timing control operation. We now describe an apparatus for detecting the position of a shutter blade included in a shutter mechanism as an example. Generally, immediately after the opening formed by shutter blades is released, the operating characteristics of the shutter blades are not stable by the effects of the camera's posture and for other causes. In order to obtain an adequate exposure time, a certain preparatory interval is required until the operating characteristics of the shutter blades become stable. Accordingly, in an ordinary shutter mechanism, after the opening formed by the shutter blades is released, the blades go through the preparatory interval and move until a pinhole is formed. This state is detected. In response to this, the exposure time and the timing at which the strobe is synchronized are controlled.

Good examples of this position sensor are widespread position sensors using a light switch such as a photo-interrupter or photo-reflector. In such a widespread position sensor, shutter blades are moved so as to block and unblock an optical path going from a light-emitting portion to a light-receiving portion. FIG. 6 illustrates the principle of one example of a blade position detector using a photo-reflector. In the illustrated circuit, a reflector 3 is disposed in an optical path going from a light-emitting diode 1 to a phototransistor 2. The front end, for example, of a shutter blade 4 is made to pass through the optical path containing the reflector 3. The shutter blade 4 blocks the optical path and then releases it. At this instant, the phototransistor 2 is turned on. This turns on a switching transistor 5. At this instant, an exposure control circuit 6 is started to be triggered.

However, the output from the light-emitting diode, the reflectivity of the photo-reflector, the sensitivity of the phototransistor, and other factors vary among different commercial products. Therefore, where the above-described method is employed, one conventional technique is to adjust the output from the light-emitting diode 1 by means of a variable resistor 7 or the like installed in a circuit when the apparatus is shipped. However, the camera user is not urged to periodically inspect the camera with certainty. Consequently, this method cannot cope with a situation in which the camera ages and the performance of each component of the photo-reflector changes. Another problem with a camera is that its power source depends on a dry battery or dry cell. That is, the stability of the power source is quite low. Hence, an accurate voltage-regulated circuit is necessitated.

DISCLOSURE OF THE INVENTION

In view of the foregoing problems, the present invention has been made. It is an object of the invention to provide a position sensor which is not adversely affected if components such as a photo-reflector age and which does not require an accurate voltage-regulated circuit.

The present invention is based on a position sensor comprising a sensor means having a detecting portion and a comparator means for comparing the output level from the sensor means with a threshold level and for producing a signal indicating the position. The detecting portion is disposed along the operating line of an object whose position is to be detected.

In one feature of the invention, the output level is preliminarily read prior to the operation for detecting the position of the object when it is operating. The threshold level of the comparator means is established in response to the read output level.

In the novel structure constructed above, before an actual operation for detecting the position, the output level from the detecting means is preliminarily read. In response to the output level from the sensor means at the instant of this reading, the threshold level of the comparator means is established. Therefore, it is not necessary to adjust the operating point according to the characteristics of the used sensor means or to install a voltage-regulated power circuit. Also, if the sensor means ages and deteriorates in performance, the threshold level can be automatically corrected each time a photographic operation is performed.

Preferably, the novel apparatus is equipped with a sensor means whose analog output varies, depending on whether the detecting portion is operating or not. The object whose position is to be detected has a portion that causes the detecting portion to make a transition from a first operating state to an unoperated state and then to a second operating state when the object is operating. When the detecting portion is in the first operating state, the threshold level of the comparator means is established in response to the output from the sensor means. In this way, the threshold level can be automatically corrected in the same way as in the above-described structure.

More preferably, in the second operating state, the object is activated in second operating conditions. This can bring the load conditions imposed during the preliminary reading into agreement with the load conditions imposed during actual reading. In consequence, the effects of variations in the load on the sensor can be circumvented.

BEST MODE FOR CARRYING OUT THE INVENTION

Figure 1:
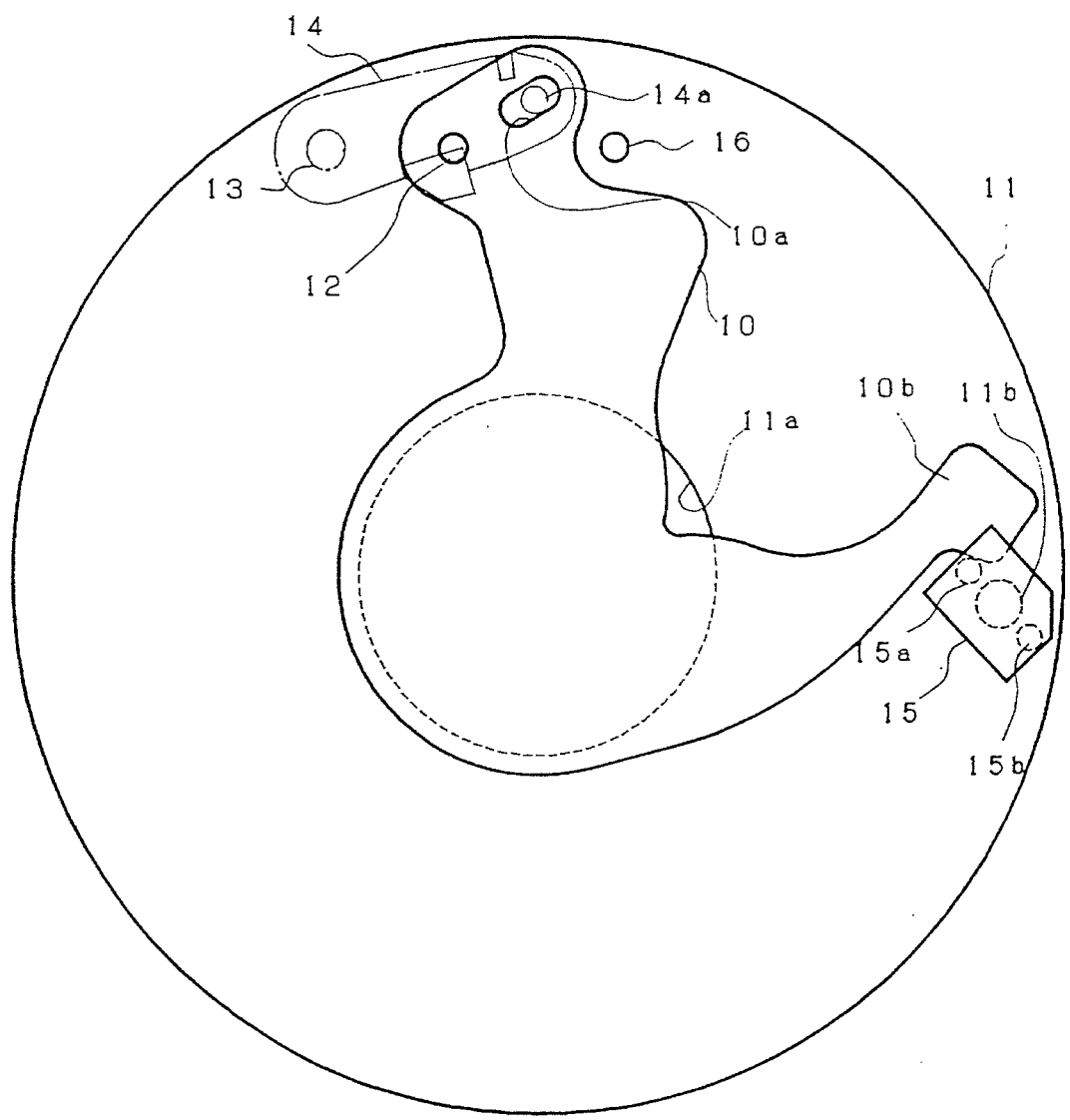
FIG. 1 is a cross-sectional view of a position sensor according to the invention.

A shutter mechanism acting also as a stop is described in detail by referring to the drawings. This mechanism is one example of the invention. FIG. 1 shows a shutter mechanism to which the invention is applied. A shutter blade 10 is swingably held to a shaft 12 on the base plate 11. Another shaft 13 is mounted on the rear surface of the base plate 11. An opening lever 14 is swingably held to the shaft 13. An engaging pin 14a is attached to the front end of the lever 14, extends through the base plate 11, and is engaged in a slot 10a formed in the shutter blade 10. Therefore, when the opening lever 14 is rotated to the right about the shaft 13, the shaft blade 10 turns to the right about the shaft 12 while the slot 10a is engaged by the engaging pin 14a. As a result, the blade 10 opens an aperture 11a formed in the center of the base plate 11.

A photo-reflector 15 comprises a light-emitting diode 15a and a phototransistor 15b which are a light-emitting portion and a light-receiving portion, respectively. This photo-reflector 15 is mounted in a manner not illustrated but the light-emitting surface of the light-emitting diode 15a and the light-receiving surface of the phototransistor 15b are mounted in front of the shutter blade 10 so as to face the base plate 11. A reflector 11b having a high reflectivity is formed by evaporation or other method at the location on the base plate 11 at which the light-emitting diode 15a emits light. If the reflectivity of the base plate 11 itself is high, the base plate 11 itself can be used as a reflector without performing evaporation or the like.

A blocking blade piece 10b is formed integrally with the front end of the shutter blade 10 to block and unblock the optical path going from the light-emitting diode 15a to the phototransistor 15b. In the present example, the blocking blade piece 10b unblocks the optical path extending from the light-emitting diode 15a to the phototransistor 15b under the initial condition. The blade 10 rotates to the right about the shaft 12 so as to open the aperture. This blocks the optical path going from the light-emitting diode 15a to the phototransistor 15b. The blade further opens the aperture and unblocks the optical path extending from the light-emitting diode 15a to the phototransistor 15b immediately before the shutter blade 10 forms a pinhole. In the present example, when the shutter blade is in its initial position, the light-emitting diode 15a is made to emit, which is hereinafter referred to as the previous emission. The present example is characterized in that the threshold level is established in response to the output from the phototransistor 15b at the time of the previous emission. In the figure, only the shutter blade 10 is shown. Another shutter blade whose shape has an essentially symmetrical relation to the shape of the shutter blade 10 is pivoted to a shaft 16. This shutter blade (not shown) is rotated to the left about the shaft 16 when the opening lever 14 rotates to the right, and opens the aperture 11a.

Figure 2:
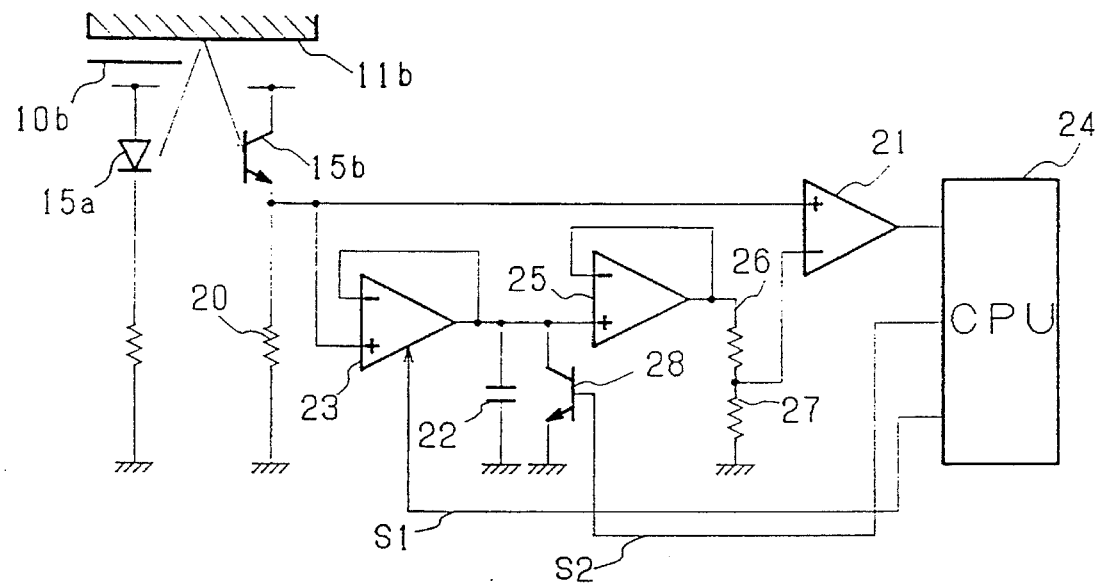
FIG. 2 is a circuit diagram of an analog circuit embodying the concept of the invention.

FIG. 2 is a circuit diagram of a first example of the invention. Indicated by 10b, 11b, 15a, and 15b are the aforementioned blocking blade piece 10b, reflector 11b, light-emitting diode 15a, and phototransistor 15b, respectively. The photocurrent produced from the phototransistor 15b is varied by the intensity of light incident on the phototransistor 15b, the light being emitted by the light-emitting diode 15a. A voltage developed across a resistor 20 is varied by the photocurrent, and this voltage is applied to the noninverting input of a comparator 21. The present example is characterized in that a capacitor 22 is electrically charged according to the photocurrent produced from the phototransistor 15b during the previous emission, and that the threshold level applied to the inverting input of the comparator 21 is controlled according to the charging level of the capacitor 22.

More specifically, the output from a voltage follower 23 having a control input is applied to the terminal point of the capacitor 22. When a control signal S1 applied from a CPU 24 goes high, the voltage follower 23 is enabled, in which case the level developed across the resistor 20 is applied to the capacitor 22. Then, the capacitor 22 is charged to the terminal level of the resistor 23.

The charging level of this capacitor 22 is applied via a voltage follower 25 to a series combination of resistors 26 and 27. The voltage level is approximately halved by the resistors 26 and 27 and applied to the inverting input of the comparator 21. A switching transistor 28 for discharging the capacitor 22 is caused to conduct when a control signal S2 applied from the CPU 24 goes high, thus releasing the electric charge stored in the capacitor 22.

The operation of the present example is described next by referring to the items described above. First, in the initial state, the shutter mechanism assumes the state shown in FIG. 1. The aperture 11a is blocked by the shutter blade 10 and the other shutter blade (not shown) pivoted to the shaft 16. The blocking blade piece 10b unblocks the optical path going from the light-emitting diode 15a to the phototransistor 15b.

Under this condition, driving pulses are supplied to a stepper motor (not shown). When the stepper motor rotates a given number of steps, a disengaging member (not shown) releases the opening lever 14. The lever 14 rotates to the right about the shaft 13. The present example is characterized in that the light-emitting diode 15a is made to emit previously after the supply of the driving pulses to the stepper motor is started and before the opening lever 14 is released.

More specifically, after the driving pulses are supplied to the stepper motor, a driving current is supplied to the light-emitting diode 15a before the opening lever 14 is released. The control signal S1 is made to go high, while the control signal S2 is caused to go low.

During this previous emission, the blocking blade piece 10b unblocks the optical path going from the light-emitting diode 15a to the phototransistor 15b. Therefore, light emitted by the diode 15a is reflected by the reflector 11b and enters the phototransistor 15b. A voltage corresponding to the current flowing via the phototransistor 15b is developed across the terminals of the resistor 20.

At this time, the voltage follower 23 is enabled by the control signal S1 which is in the high level and so the voltage follower 23 delivers the voltage developed across the terminals of the resistor 20. The transistor 28 is cut off by the control signal S2 that is in the low level. Consequently, the capacitor 22 is charged to the output level of the voltage follower 23 corresponding to the terminal level at the resistor 20. The terminal level across the capacitor 22 is applied via the voltage follower 25 to the series combination of the resistors 26 and 27. The voltage level approximately halved by the resistors 26 and 27 is applied as the threshold level to the noninverting input of the comparator 21.

Subsequently, if the opening lever 14 is released, the shutter blade 10 rotates to the right about the shaft 12 while the pin 14a is engaged in the slot 20a. During this clockwise rotation of the shutter blade 10, the blocking blade piece 10b blocks the optical path going from the light-emitting diode 15a to the phototransistor 15b before the shutter blade 10 forms a pinhole in practice. Immediately before the blade 10 forms the pinhole actually, the blocking blade piece 10b again unblocks the optical path going from the light-emitting diode 15a to the phototransistor 15b.

During the clockwise rotation of the shutter blade 10, if the blocking blade piece 10b blocks the optical path going from the light-emitting diode 15a to the phototransistor 15b, then a photocurrent no longer flows from the phototransistor 15b to the resistor 20. The voltage across the terminals of the resistor 20 substantially drops to ground level. The level at the noninverting input becomes sufficiently lower than the level at the inverting input of the comparator 21. In consequence, the output from the comparator 21 goes low.

Subsequently, if the shutter blade 10 rotates further to the right, and if the blocking blade piece 10b again unblocks the optical path going from the light-emitting diode 15a to the phototransistor 15b, then a photocurrent flows from the phototransistor 15b to the resistor 20. This photocurrent causes the voltage across the resistor 20 to be applied to the noninverting input of the comparator 21. Meanwhile, the level at the inverting input of the comparator 21 is obtained by dividing the charging level of the capacitor 22 approximately by a factor of two by means of the resistors 26 and 27. As described already, the charging level of this capacitor 22 is equal to the voltage across the resistor 20 during the previous emission, the voltage being stored. In an additional feature of the present example, the previous emission operation is performed while supplying the driving pulses to the stepper motor. Therefore, the conditions under which the phototransistor 15b operates during the previous emission substantially agrees with the conditions under which the phototransistor operates during actual detection operation. It is assured that the level at the noninverting input of the comparator 21 is higher than the threshold level which is obtained by dividing the charging level of the capacitor 22 by a factor of approximately 2. The output from the comparator 21 is inverted, i.e., changes from low to high level.

The CPU 24 starts to control the exposure of the shutter mechanism and the timing at which the strobe is synchronized when the output from the comparator 21 changes into high level. After one photography operation is completed, the control signal S2 goes high, turning on the transistor 25. In this way, the electric charge stored in the capacitor 22 is released.

Figure 3:
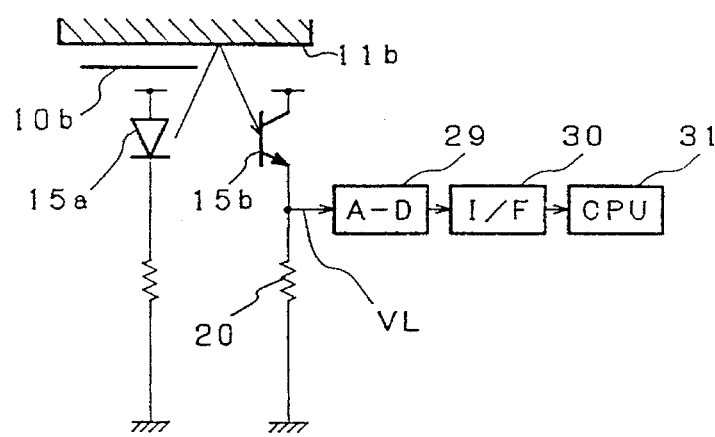
FIG. 3 is a block diagram illustrating software processing for embodying the invention.
Figure 4:
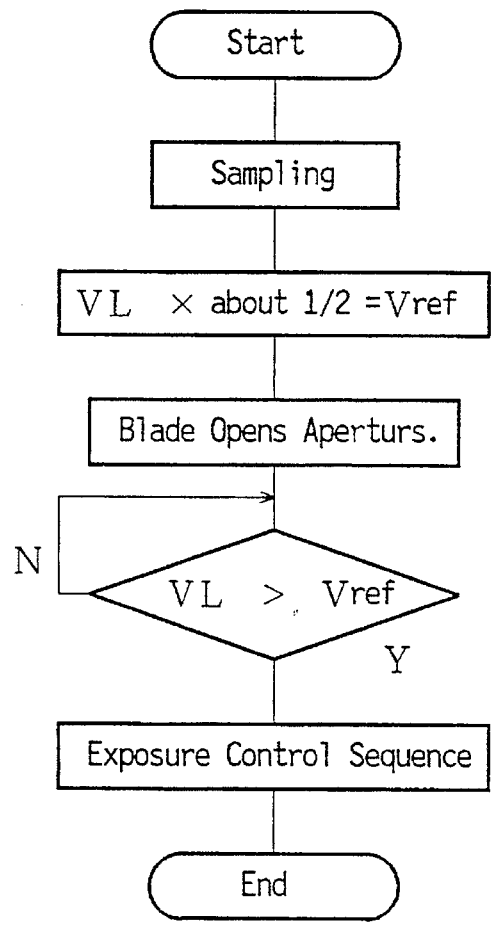
FIG. 4 is a flowchart illustrating the example shown in FIG. 3.

FIG. 3 shows an example in which the present invention is implemented by software instead of the analog circuit described above. FIG. 4 is a flowchart illustrating it. Like components are indicated by like reference numerals in various figures including FIG. 2 and those components which have been already described will not be described below. A terminal voltage VL is developed across the resistor 20 by a photocurrent flowing through the phototransistor 15b. This terminal voltage VL is converted into digital form by an analog-to-digital converter circuit 29. The converted value is applied to a CPU 31 via an interface 30.

The operation is described now in detail. The driving pulses are supplied to the stepper motor (not shown). The light-emitting diode 15a is made to emit previously. The terminal voltage VL developed across the resistor 20 at this time is converted into digital form and sampled. The resulting value is multiplied by approximately ½. The product is stored as a reference voltage Vref. Then, the opening lever 14 is released to cause the shutter blade 10 to open the aperture. Thereafter, the terminal voltage VL across the resistor 20 is monitored. When the terminal voltage VL exceeds the reference voltage Vref, the shutter blade is regarded as having reached a desired position. The following exposure sequence is executed.

Figure 5:
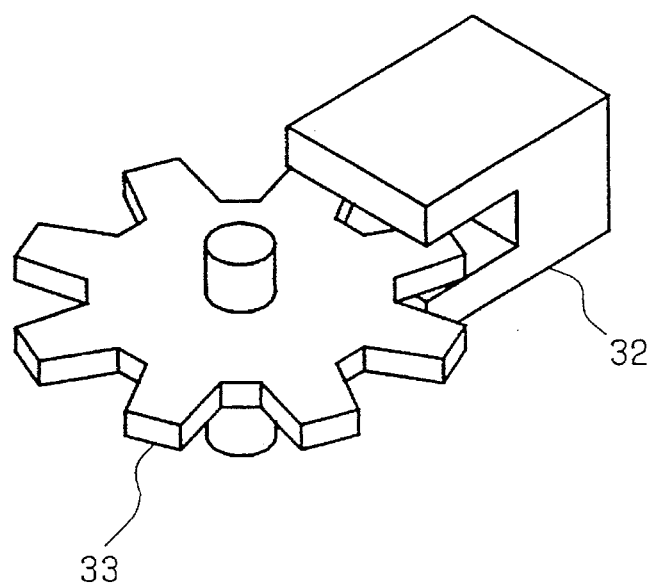
FIG. 5 is a perspective view of another example of the invention.
Figure 6:
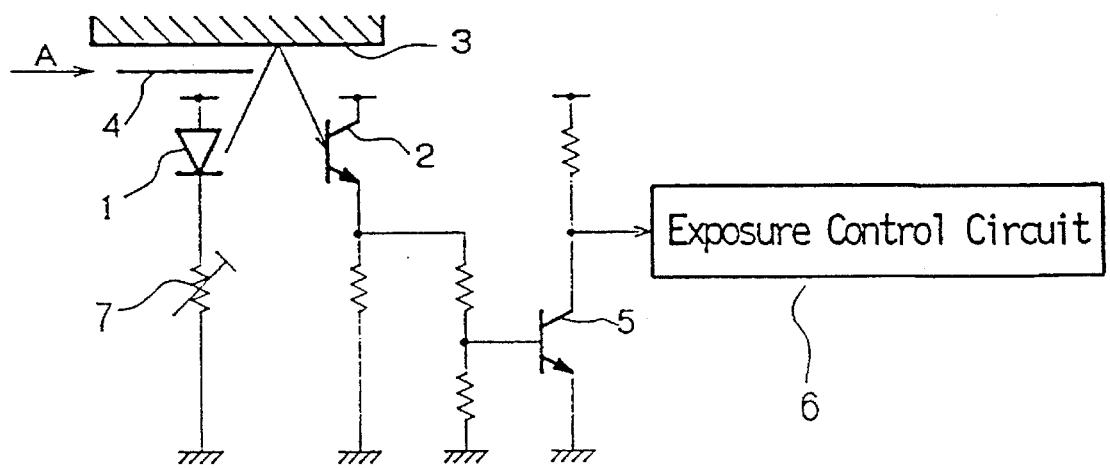
FIG. 6 is a circuit diagram of the prior art position sensor.

In the above examples, a photo-reflector is used as one example of the sensor means, and the present invention is applied to detection of the position of the shutter blade. The invention can be applied to other means. Of course, a light switch such as a transmission-type photo-interrupter can be used. The invention can be applied to various sensor means other than optical switches as long as the analog output from the sensor means varies, depending on whether the detecting portion is operating or not. Furthermore, no problem takes place if the detected object can be other than a shutter blade. For example, FIG. 5 shows an example in which a decision is made as to whether a toothed wheel 33 such as a motor pinion inside a camera has reached a given angular position, using a transmission-type photo-interrupter 32. The present invention can be directly applied to this case.

INDUSTRIAL APPLICABILITY

As described thus far, according to the present invention, prior to an operation for detecting a position in practice, the output level from a detecting means is preliminarily read. The threshold level of a comparator means is established according to the level of the output from the sensor means during the preliminary reading. Therefore, it is not necessary to adjust the operating point according to the characteristics of the used sensor means or to install an accurate voltage-regulated power circuit. Also, if the sensor means ages and deteriorates in performance, the threshold level can be automatically corrected each time a detection operation is performed. Hence, the detecting operation can be carried out without being affected by aging. In addition, where the load conditions during previous emission are made coincident with the load conditions during detection as in the above examples, the effects of drop of the power level caused by load variations can be substantially avoided.

I claim:

1. A position sensor comprising:

sensor means for detecting a position of an object, said sensor means having a detecting portion disposed along an operation line of said object, said sensor means producing an output signal;

threshold level determining means for reading a first output level of said output signal from said sensor means to determine a threshold level from said first output level; and comparator means for comparing a second output level of said output signal from said sensor means with said threshold level and for producing a position signal indicative of said position, said threshold level determining means reading said first level of said output signal prior to said comparator means producing said position signal to establish said threshold level of said comparator means according to said first level of said output signal.

2. The position sensor of claim 1, wherein said sensor means includes light-emitting means for emitting light and light-receiving means for receiving said emitted light, said position sensor including an optical path going from said light-emitting means to said light-receiving means to form a light switch that is operated by said object to be detected.

3. The position sensor of claim 1, wherein said comparator means includes means for producing said position signal when said second output level from said sensor means exceeds said threshold level.

4. The position sensor of claim 3, wherein said threshold level is determined based on one-half of said first output level obtained from said sensor means.

5. A position sensor comprising:

sensor means for sensing a position of an object, said sensor means having a detecting portion disposed along an operation line of said object to be detected, said detecting portion producing an analog output signal which varies based on an operating state of said detecting portion; and comparator means for producing an output signal when said analog output signal from said sensor means changes from a first level indicating non-operation of said detecting portion to a second level indicating operation of said detecting portion across a threshold level, said object having a portion for permitting said detecting portion to shift from a first operating state to a non-operating state and then to a second operating state during detection of said position of said object, said threshold level of said comparator being established according to said analog output signal from said sensor means when said detecting means is in said first operating state.

6. The position sensor of claim 5, wherein said object is operated when said detecting portion is in said first operating state.

7. The position sensor of claim 5, wherein said sensor means is equipped with a light-emitting means for emitting light and a light-receiving means for receiving said emitted light, said position sensor including an optical path going from said light-emitting means to said light-receiving means to form a light switch that is operated by said object.

8. A position sensor comprising:

sensor means for sensing an object, said sensor means having a detecting portion disposed along an operation line of a shutter blade to block and unblock an optical path going from a subject to an image plane, said sensor means producing an analog output signal which varies in accordance with an operation of said detecting portion; and comparator means for producing an output signal when said analog output signal from said sensor means changes from a first level indicating non-operation of said detecting portion to a second level indicating operation of said detecting portion across a threshold level, said shutter blade including shifting means for shifting said detecting portion from a first operating state to a non-operating state and then to a second operating state during operation of said shutter blade, said threshold level of said comparator means being established according to said analog output signal from said sensor means when said detecting portion is in said first operating state.

9. The position sensor of claim 8, wherein said shutter blade is operated when said detecting portion is in said first operating state.

10. The position sensor of claim 8, wherein said sensor means includes light-emitting means for emitting light and a light-receiving means for receiving light, said sensor means also including an optical path going from said light-emitting means to said light-receiving means to form a light switch that is operated by said shutter blade.

* * * * *